United States Patent [19]

Beard

[11] Patent Number: 4,940,067
[45] Date of Patent: Jul. 10, 1990

[54] JOINING APPARATUS FOR CUTTING WORK PIECES

[76] Inventor: Paul R. Beard, 6409 Renaldo Way S., St. Petersburg, Fla. 33707

[21] Appl. No.: 446,800

[22] Filed: Dec. 6, 1989

[51] Int. Cl.$^5$ .............................. B27F 5/00; B27F 1/06
[52] U.S. Cl. ....................................... 144/2 R; 33/537; 144/82; 144/84; 144/134 A; 144/136 R; 144/137; 144/371; 269/79; 409/168; 409/224; 409/229
[58] Field of Search ................ 269/71, 79, 91, 97; 33/537, 538, 568, 569, 570; 409/168, 224, 229; 144/82, 85, 84, 87, 134 A, 136 R, 137, 286 R, 286 A

[56] References Cited

U.S. PATENT DOCUMENTS

| | | | |
|---|---|---|---|
| 274,162 | 3/1883 | Wilson | 409/224 |
| 2,365,436 | 12/1944 | Saucier | 269/79 X |
| 2,411,641 | 11/1946 | Sealey | 409/168 |
| 4,163,465 | 8/1979 | Strong | 144/87 |
| 4,305,439 | 12/1981 | Skinner | 409/224 |
| 4,466,601 | 8/1984 | Raines | 269/79 |
| 4,693,288 | 9/1987 | Buechele et al. | 144/87 |
| 4,741,370 | 5/1988 | Heaton | 144/136 R |
| 4,749,013 | 6/1988 | Ducate, Sr. | 144/84 |
| 4,763,706 | 8/1988 | Rice et al. | 144/84 |
| 4,884,604 | 12/1989 | Rice et al. | 144/84 |

*Primary Examiner*—W. Donald Bray
*Attorney, Agent, or Firm*—Donald A. Kettlestrings

[57] ABSTRACT

Apparatus for cutting biscuit joints can be quickly and easily mounted onto a conventional router table. The apparatus cuts mitered and compound mitered biscuit joints and it includes a work piece support surface which can be angularly adjusted with respect to the router table and cutting element and which can be moved toward and away from the cutting element to enable the cutting element to form cuts in a work piece positioned on the work piece support.

20 Claims, 3 Drawing Sheets

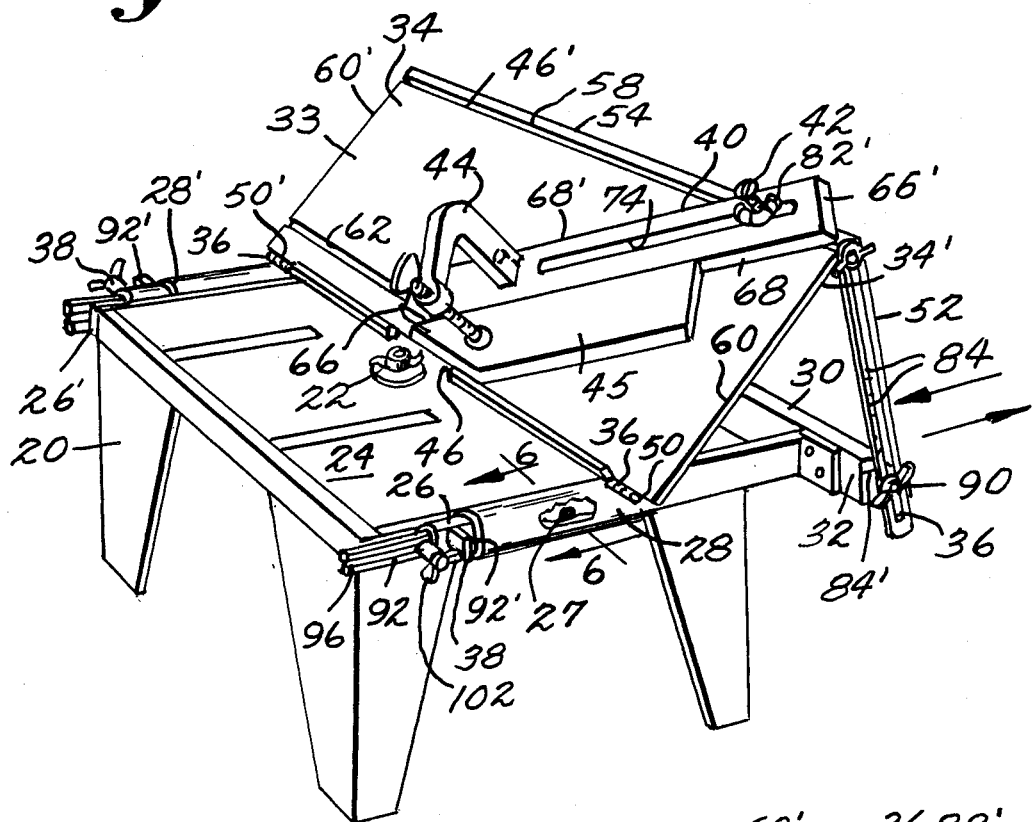
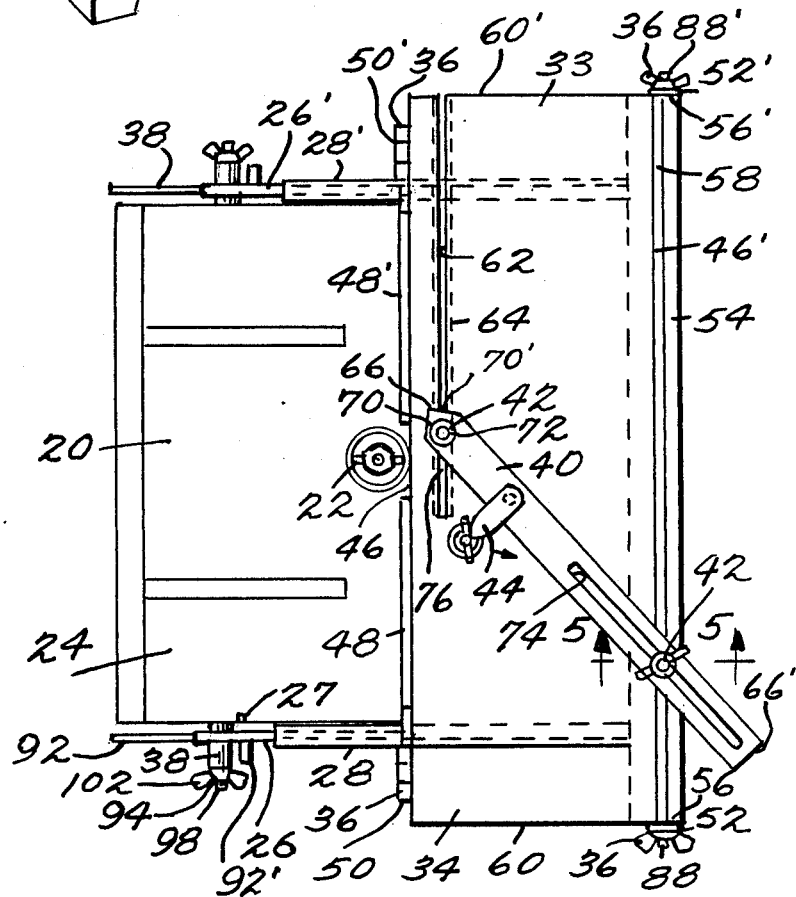

JOINING APPARATUS FOR CUTTING WORK PIECES

This invention relates to apparatus for cutting work pieces and more particularly to joining apparatus for cutting biscuit and spline joints.

Various types of biscuit joiners are known, but such joiners have not proved entirely satisfactory under all conditions of service because they cannot quickly and easily perform cuts for biscuit joints on miters and compound miters. Existing biscuit joiners also typically require that each work piece be separately marked, and biscuit joiners typically cannot also cut spline and mitered spline joints.

It is, therefore, an object of the present invention to provide biscuit joining apparatus for cutting work pieces which can cut work pieces with mitered and compound mitered surfaces.

Another object is to provide such apparatus which requires that only one work piece be marked to produce an unlimited number of identical cuts on additional work pieces.

A further object of the invention is the provision of such apparatus which can be quickly and easily mounted on conventional router tables.

Still another object is to provide such joining apparatus which enables biscuit joint cuts to be made even on very small work pieces.

A still further object is to provide such apparatus which has the additional capability of making cuts in work pieces for spline joints and mitered spline joints.

Another object is to provide such apparatus which is inexpensive to manufacture.

Yet another object of the present invention is the provision of such apparatus which enables cuts to be made in a work piece without the necessity of clamping the work piece in place.

A still further object is to provide such apparatus which can perform joint cuts more quickly and with more accuracy than previously known devices.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

The accompanying drawings, which are incorporated in and constitute a part of this specification, illustrate an example of a preferred embodiment of the invention and, together with the description, serve to explain the principles of the invention.

FIG. 1 is a perspective view of the joining apparatus mounted on a conventional router table and showing the work piece support positioned to enable the router cutter to cut a biscuit slot in a compound miter surface of a work piece;

FIG. 2 is a top plan view of the joining apparatus mounted on a conventional router table and showing the work piece support positioned to enable the router cutter to cut a biscuit slot in a mitered surface of a work piece, not shown;

Figure 3:
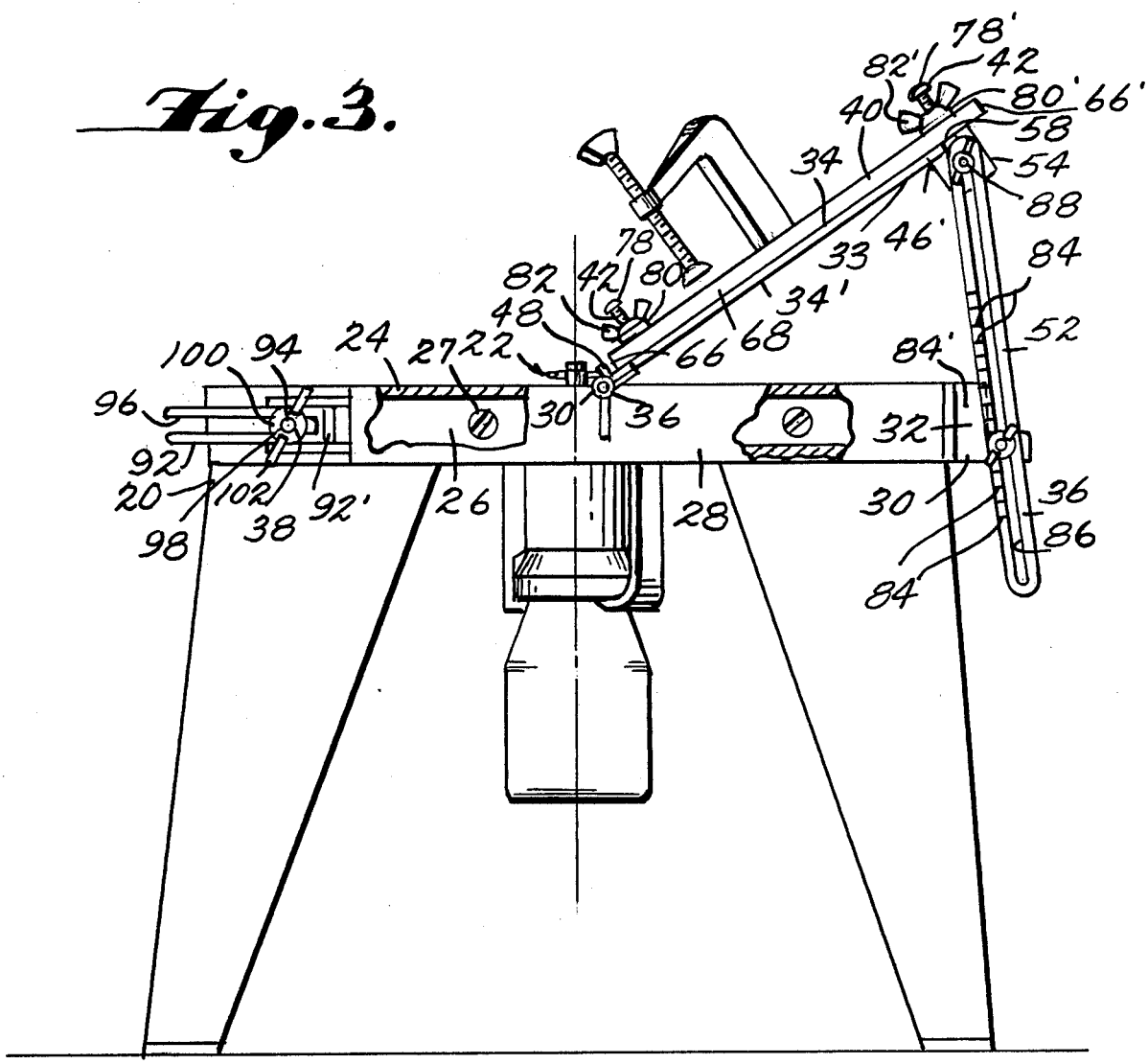
FIG. 3 is a side elevation view of the apparatus shown in FIG. 1 with a portion illustrated in fragmentary section.
Figure 4:
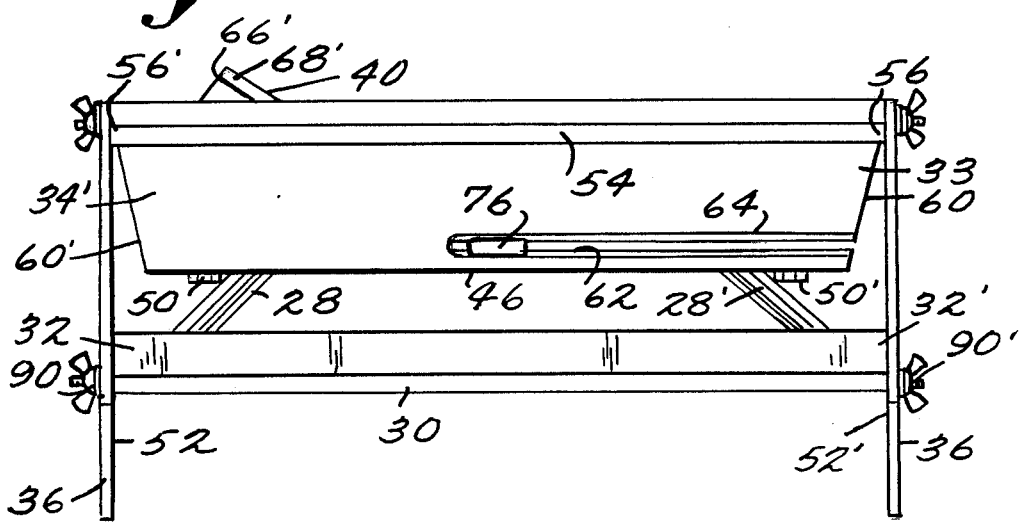
FIG. 4 is a rear perspective view of the apparatus shown apart from the router table.
Figure 5:
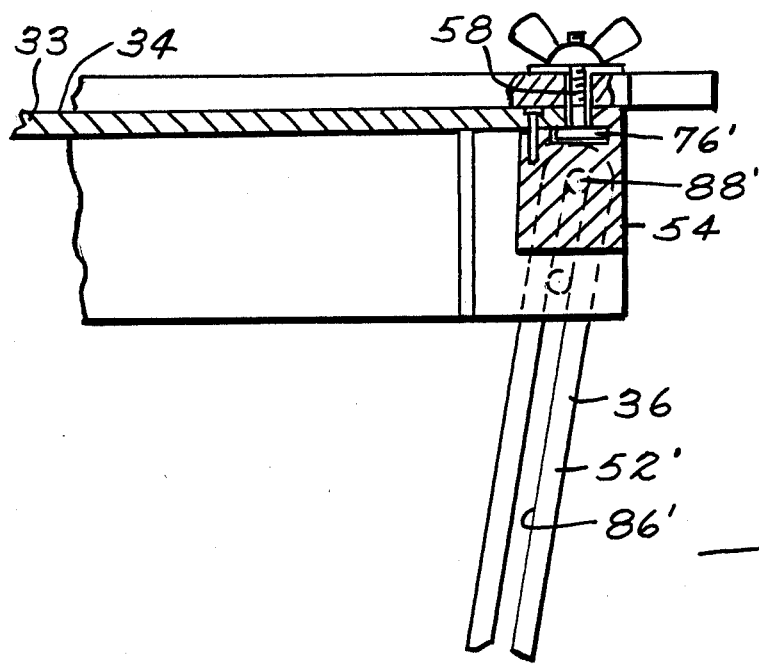
FIG. 5 is a cross-sectional view taken along the line 5—5 in FIG. 2 and looking in the direction of the arrows.
Figure 6:
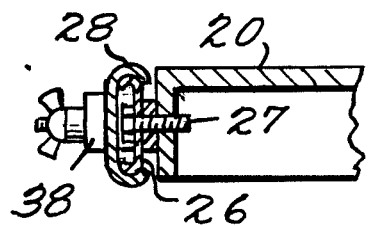
FIG. 6 is a cross-sectional view taken along the line 6—6 in FIG. 1 and looking in the direction of the arrows.
Figure 7:
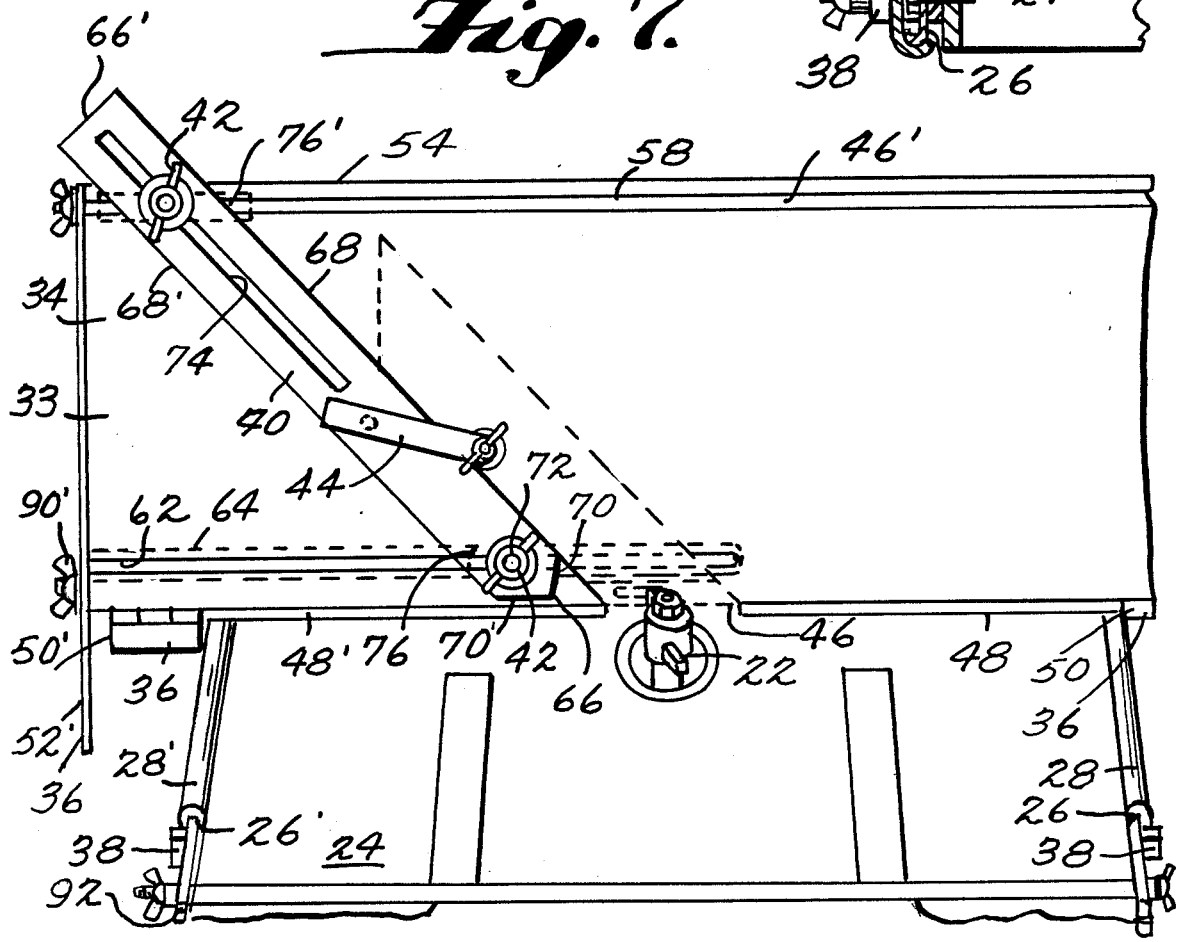
FIG. 7 is a front fragmentary perspective view of the apparatus mounted on a conventional router table and showing a work piece in phantom.

With reference now to the drawings, wherein like reference characters designate like or corresponding parts throughout the several views, there is shown a first support or conventional router table 20 having a cutting element or tool 22 attached to and projecting upwardly above an upper substantially flat surface 24 of the router table.

First and second guide elements 26, 26' are attached to the sides and/or legs of router table 20 and are positioned in substantially parallel relationship with each other. Guide elements 26, 26' can be quickly and easily attached to the router table by the use of bolts which project through openings in the sides and/or legs of the router table or by other conventional means.

A first slide element 28 is adapted to be removably and slideably mounted on first guide element 26, and a second slide element 28' is adapted to be removably and slideably mounted onto second guide element 26'. Slide elements 28, 28' may be conventional drawer guides, or alternatively, slide elements 28, 28' may be metal stampings which are shaped and sized to slideably grasp and engage guide elements 26, 26'.

A connecting element 30, which defines opposed ends 32, 32', extends between and is attached to slide elements 28, 28'. A work piece support 33 having a work piece support surface 34 is provided, and means 36 are provided in operative relationship with support surface 34 and with slide elements 28, 28' for enabling the adjustable positioning of support surface 34 with respect to flat surface 24 of router table 20 and with respect to cutting element 22. In addition, means 38 are provided in operative relationship with at least one of guide elements 26, 26' and with a respective one of slide elements 28, 28' for adjustably limiting movement of the slide element on its respective guide element.

In accordance with the invention, a work piece guide bar 40 is positioned on work piece support surface 34, and means 42 are provided in operative relationship with bar 40 and with support surface 34 for adjustably positioning bar 40 with respect to surface 34. Means 44 are attached to bar 40 for adjustably clamping a work piece 45 in removable fixed position on support surface 34.

Support surface 34 defines first and second opposed edges 46, 46' and further includes a first fence element 48 attached to a first predetermined portion of first edge 46 and projecting above work piece support surface 34. A second fence element 48' is attached to a second predetermined portion of first edge 46 and projects above support surface 34, and fence elements 48, 48' are spaced apart from each other along edge 46 to form an opening between the fence elements. Each of fence elements 48, 48' may typically project approximately three sixteenths of an inch above surface 34, and the space between fence elements 48, 48' may typically be approximately two inches.

In accordance with the invention, means 36 for enabling the adjustable positioning of work piece support surface 34 include first and second hinge elements 50, 50' attached, respectively, to slide elements 28, 28' and adjacent to edge 46 of work piece support 33. Enabling means 36 further include adjustable supports 52, 52' connected between work piece support 33 and connecting element 30 whereby movement of adjustable supports 52, 52' and hinge elements 50, 50' enables work piece support surface 34 to be adjustably positioned with respect to upper surface 24 of router table 20 and with respect to cutting element 22. As will be further described, enabling means 36, which includes hinge elements 50, 50' and adjustable supports 52, 52', allows work piece support surface 34 to be adjusted and fixedly positioned in relative angular position with respect to upper surface 24 of router table 20. Typically, work piece support surface 34 can be adjusted in relative angular position with respect to upper surface 24 of the router table from at least zero degrees to forty-five degrees.

Work piece support 33 defines a lower surface 34' opposed to upper work piece support surface 34, and an elongated support member 54, defining opposed ends 56, 56', is attached to lower surface 34' and extends beyond second edge 46' of work piece support 33. Elongated support 54 defines a groove 58 which has a substantially T-shaped cross-section, and groove 58 extends from end 56' substantially along the entire length of support member 54. Groove 58 is positioned with one side of the groove in substantial alignment with and substantially along the entire length of edge 46'.

Connecting element 30 is substantially L-shaped in cross-section, and elongated support member 54 is of a size and configuration to removably fit within and in complement with connecting element 30 to enable work piece support surface 34 to be adjustably positioned in substantially parallel or zero angle relationship with respect to upper surface 24 of router table 20.

Work piece support 33 defines third and fourth opposed side edges 60, 60', and means 42 for adjustably positioning bar 40 include a first slot 62 defined within work piece support surface 34 and extending from side edge 60' in substantially parallel relationship with edge 46. A countersunk slot 64 of a wider dimension than the width dimension of slot 62 is defined within lower surface 34' of work piece support 33 and extends in fluid communication and in substantial alignment with slot 62 for substantially the entire length of slot 62.

In accordance with the invention, guide bar 40 defines a first pointed end 66 and a second opposed end 66'. Guide bar 40 also defines opposed and substantially parallel side edges 68, 68'. A first forward edge 70 of pointed end 66 preferably forms an angle of substantially forty-five degrees with an imaginary projection (not shown) of side edge 68, and a second forward edge 70' of pointed end 66 forms an angle of substantially forty-five degrees with an imaginary projection (not shown) of side edge 68'. The angle formed by forward edges 70, 70' at pointed end 66, therefore is preferably substantially ninety degrees.

Guide bar 40 further defines an opening 72 through the guide bar and adjacent to pointed end 66, and guide bar 40 also defines a guide bar slot 74 through the guide bar which extends from a position adjacent to end 66' for a predetermined distance along the length of the guide bar. In accordance with the invention, means 42 for adjustably positioning guide bar 40 include a first elongated element 76 slideably positioned within countersunk slot 64. A first threaded bolt 78 passes through opening 72, through slot 62, and through countersunk slot 64, and bolt 78 is attached to first elongated element 76. A first washer 80 and a first nut 82 are positioned on bolt 78 with guide bar 40 located between washer 80 and support surface 34.

Means 42 further include a second elongated element 76' slideably positioned within groove 58 in support member 54. A second threaded bolt 78' passes through guide bar slot 74 and into T-shaped groove 58. Bolt 78' is attached to second elongated element 76'. A second washer 80' and a second nut 82' are positioned on second bolt 78' with guide bar 40 located between washer 80' and work piece support surface 34.

At least one of adjustable supports 52, 52' defines first indicia 84 thereon, and connecting element 30 defines second indicia 84' thereon for visually indicating the angle of work piece support 33 with respect to surface 24 of the router table.

In accordance with the invention, adjustable supports 52, 52' are bar-shaped elements which each define first and second elongated openings 86, 86', respectively. First and second fastening elements 88, 88' rotatably attach upper ends of support bar elements 52, 52', respectively, to opposed ends 56, 56' of elongated support member 54. First and second adjustable fastening elements 90, 90' pass through elongated openings 86, 86', respectively, and are adjustably attached to opposite ends 32, 32' of connecting element 30 whereby the angular position of work piece support surface 34 with respect to flat surface 24 of router table 20 can be varied by moving support bar elements 52, 52' with respect to adjustable fastening elements 90, 90'. Each of fastening elements 90, 90' can be tightened to fix the positions of support bar elements 52, 52' with respect to connecting element 30 and to fix the angular position of work piece support surface 34 with respect to top surface 24 of the router table.

Movement limiting means 38 preferably include at least one substantially L-shaped element 92. Means 94 are provided in cooperation with L-shaped element 92 and with first guide element 26 for enabling the adjustable positioning of L-shaped element 92 with respect to guide element 26. A predetermined portion 92' of element 92 is positioned to selectively contact first slide element 28 and to restrict forward movement of slide element 28 with respect to guide element 26.

More specifically, L-shaped element 92 defines an elongated, slotted opening 96, and adjustable positioning means 94 preferably include a threaded element 98 attached to guide element 26 in a conventional manner and passing through slotted opening 96. A washer 100 and a nut 102 are positioned on threaded element 98 with L-shaped element 92 located between guide element 26 and washer 100. By loosening nut 102 on threaded element 98, L-shaped element 92 can be slideably adjusted in a lengthwise direction along the length of elongated opening 96 with respect to guide element 26. This adjustment can continue until portion 92' is located in a desired position for stopping forward slideable movement of slide element 28 over guide element 26. Nut 102 can then be tightened onto threaded element 98 to hold L-shaped stop element 92 in the desired fixed position.

In operation, guide elements 26, 26' can be attached to the sides of a conventional router table 20 by use of bolts 27 or other conventional fastening means. Slide elements 28, 28' can then be quickly and easily positioned at the ends of guide elements 26, 26', and slide elements 28, 28' can then be slideably moved forward onto the guide elements by pushing against connecting element 30. Conversely, the slide elements can be removed from the guide elements by simply pulling backward on connecting element 30. After slide elements 28, 28' have been positioned onto guide elements 26, 26', the apparatus is ready for use.

To cut slots in work pieces for flat left or flat right miters or to cut slots in the ends of work pieces that are not mitered, work piece support 33 is rotated about hinges 50, 50' until work piece support surface 34 is positioned in substantially parallel or zero degree relationship with respect to upper flat surface 24 of router table 20. Adjustable fastening elements 90, 90' are then tightened to hold supports 52, 52' in fixed position with work piece support surface 34 in the desired position in parallel relationship with router table surface 24.

A work piece to be cut is then positioned onto surface 34 with the face to be cut positioned against fence elements 48, 48'. The center of the cut can be marked onto the work piece, and the work piece is positioned with the mark centered in the space between fence elements 48, 48'.

Guide bar 40 is then moved into position against the work piece, and the guide bar is locked into position by tightening nuts 82, 82'. The work piece is then clamped against surface 34 by adjustable clamp 44. The depth of cut to be made in the work piece is determined by the operator pushing forward against connecting element 30 until the work piece contacts cutting element 22. The depth of cut can then be set by adjusting the position of L-shaped element 92 as previously described.

Connecting element 30 is then pulled backward toward the operator to clear the work piece from cutting element 22, and the router can be turned on to rotate the cutting element. The operator can then push connecting element 30 forward to cause the work piece to move against cutting element 22 until the depth of cut is reached and L-shaped stop element 92 prevents slide element 28 from moving any further forward along the length of guide element 26.

After the cut has been made in the work piece, the operator can pull back on connecting element 30 and the work piece can be removed by loosening clamp 44. It is then a simple matter to repeat the same cut on additional identical work pieces without the need for individually marking the center of the cut on each work piece. The additional work pieces can be cut without the need for clamping each work piece in position on surface 34. Rather, the operator can hold each additional work piece in position on surface 34 and against bar 40 as each additional work piece is moved into contact with cutting element 22. As a result, a large number of identical work pieces can be cut in a relatively short time.

One of the important advantages of this invention is the capability provided for quickly and easily cutting slots into compound mitered surfaces of work pieces. Depending on the angle of the miter and the angle of the cut desired, work piece support 33 can be angularly adjusted with respect to upper flat surface 24 of router table 20. This is quickly and easily accomplished by rotating work piece support 33 about hinges 50, 50' until the desired angle is reached as indicated by indicia 84, 84'. Fastening elements 90, 90' are then tightened to hold work piece support surface 34 firmly in the desired position.

The operational steps for cutting the work piece are then the same as previously described so that the work pieces are properly positioned onto work piece support surface 34.

Flat and mitered spline cuts or grooves can also be made in work pieces by this apparatus by removing guide bar 40 from work piece support 33. Removal of bar 40 is quickly and easily accomplished by loosening nuts 82, 82' and by sliding elongated elements 76, 76' out from slot 64 and groove 58, respectively. The work piece to be cut is then marked at the start and end of the length of cut to be made into the work piece. The work piece is then positioned onto surface 34 and against fence elements 48, 48'. The depth of cut is set by the operator pushing forward against connecting element 30 until the work piece contacts cutting element 22. L-shaped stop element 92 is then adjustably positioned, as previously described, to provide the required depth of cut into the work piece. The operator then pulls back on connecting element 30 to move the work piece away from the cutting element, and the router can then be energized to activate the cutting element.

The work piece is then positioned against fence elements 48, 48' with the mark on the work piece indicating the start of the cut positioned to initially contact cutting element 22 as the operator pushes forward against connecting element 30. The operator can then simultaneously press against connecting element 30 with his body and hold the work piece against fence elements 48, 48' and slide the work piece along fence elements 48, 48' to enable the cutting element to make the necessary cut into the work piece. After the cut has been made into the work piece, work piece support 33 and the work piece are then withdrawn from cutting element 22 by the operator pulling backward on connecting element 30, and additional cuts in similar work pieces can be made in a similar manner.

If a mitered spline cut is desired, work piece support 33 is angularly adjusted with respect to upper surface 24 of router table 20 by rotating work piece support 33 about hinges 50, 50' until support 33 is at the desired angle with respect to upper surface 24. Work piece support 33 is then locked into position by tightening adjustable fastening elements 90, 90'. The same procedure can then be followed as has been previously described with respect to making spline cuts or grooves, but because work piece support 33 is positioned at an angle with top 24 of the router table a mitered spline cut or groove will be formed into the work piece.

The invention in its broader aspects is not limited to the specific details shown and described, and departures may be made from those details without departing from the principles of the invention and without sacrificing its chief advantages.

What is claimed is:

1. Apparatus for cutting work pieces, said apparatus comprising:
    a first support;
    a cutting element attached to said support and projecting upwardly above said support;
    first and second guide elements attached to said support and in substantially parallel relationship with each other;
    a first slide element removably and slideably mounted on said first guide element;
    a second slide element removably and slideably mounted on said second guide element;
    a connecting element defining opposed ends and extending between and attached to said slide elements;

a work piece support having a work piece support surface;

means in operative relationship with said work piece support surface and said slide elements for enabling the adjustable positioning of said work piece support surface with respect to said first support and with respect to said cutting element; and means in operative relationship with said first guide element and with said first slide element for adjustably limiting movement of said first slide element on said first guide element.

2. Apparatus as in claim 1 further including:

a work piece guide bar positioned on said work piece support surface; and means in operative relationship with said bar and with said work piece support surface for adjustably positioning said bar with respect to said work piece support surface.

3. Apparatus as in claim 2 further including means attached to said bar for adjustably clamping work pieces in fixed position on said work piece support surface.

4. Apparatus as in claim 3 wherein said work piece support surface defines first and second opposed edges and further including:

a first fence element attached to a first predetermined portion of said first edge and projecting above said work piece support surface; and a second fence element attached to a second predetermined portion of said first edge and projecting above said work piece support surface, said fence elements being spaced apart from each other along said first edge to form an opening between said fence elements.

5. Apparatus as in claim 4 wherein said means for enabling the adjustable positioning of said work piece support surface include:

first and second hinge elements attached, respectively, to said first and second slide elements and adjacent to said first edge of said work piece support surface; and first and second adjustable supports connected between said work piece support surface and said connecting element, whereby movement of said adjustable supports and said hinge elements enables said work piece support surface to be adjustably positioned with respect to said first support and with respect to said cutting element.

6. Apparatus as in claim 5 wherein said first support defines an upper substantially flat surface and wherein said enabling means allow said work piece support surface to be adjusted and fixedly positioned in relative angular position with respect to said upper surface.

7. Apparatus as in claim 6 wherein said enabling means allow said relative angular position to be from at least zero degrees to forty-five degrees.

8. Apparatus as in claim 6 wherein said work piece support defines a lower surface opposed to said work piece support surface and further including:

an elongated support member, defining opposed ends, attached to said lower surface and extending beyond said second edge of said work piece support;

said elongated support member defining a groove having a substantially T-shaped cross-section, said groove extending from one end of said elongated support member substantially along the entire length of said elongated support member; and said groove positioned with one side of said groove in substantial alignment with and substantially along the length of said second edge.

9. Apparatus as in claim 8 wherein said connecting element is substantially L-shaped in cross-section and wherein said elongated support member removably fits within and in complement with said connecting element to enable said work piece support surface to be adjustably positioned in substantially parallel relationship with respect to said upper surface of said first support.

10. Apparatus as in claim 9 wherein said work piece support defines third and fourth opposed side edges and wherein said means for adjustably positioning said bar include:

a first slot defined within said work piece support surface and extending from said third side edge in substantially parallel relationship with said first edge; and a countersunk slot of a wider dimension than said first slot defined within said lower surface of said work piece support and extending in fluid communication with said first slot for substantially the entire length of said first slot.

11. Apparatus as in claim 10 wherein said work piece guide bar defines a first pointed end and a second opposed end.

12. Apparatus as in claim 11 wherein said work piece guide bar further defines an opening through said guide bar adjacent to said pointed end and a guide bar slot through said guide bar and extending from said second opposed end for a predetermined distance along the length of said guide bar.

13. Apparatus as in claim 12 wherein said means for adjustably positioning said guide bar further include:

a first elongated element slideably positioned within said countersunk slot;

a first threaded bolt passing through said opening, through said first slot and through said countersunk slot and attached to said first elongated element;

a first washer and a first nut positioned on said first bolt with said guide bar located between said washer and said work piece support surface.

14. Apparatus as in claim 13 wherein said means for adjustably positioning said guide bar further include:

a second elongated element slideably positioned within said groove in said elongated support member;

a second threaded bolt passing through said guide bar slot, into said T-shaped groove, and attached to said second elongated element;

a second washer and a second nut positioned on said second bolt with said guide bar located between said second washer and said work piece support surface.

15. Apparatus as in claim 14 wherein at least one of said adjustable supports defines first indicia thereon and wherein said connecting element defines second indicia thereon for visually indicating the angle of said work piece support with respect to said flat surface of said first support.

16. Apparatus as in claim 15 wherein said enabling means further include:

said first and second adjustable supports which are each bar-shaped elements defining first and second elongated openings therein, respectively;

first and second fastening elements rotatably attaching upper ends of said support bar elements, respectively, to said opposite ends of said elongated support member; and first and second adjustable fastening elements passing through said first and second elongated openings, respectively, and adjustably attached to said opposite ends of said connecting element, whereby the angular position of said work piece support surface with respect to said flat surface of said first support can be varied by moving said support bar elements with respect to said adjustable fastening elements.

17. Apparatus as in claim 16 wherein said movement limiting means include:

at least one substantially L-shaped element;

means in operative relationship with said L-shaped element and with said first guide element for enabling the adjustable positioning of said L-shaped element with respect to said first guide element; and a predetermined portion of said L-shaped element positioned to selectively contact said first slide element and to restrict movement of said first slide element with respect to said first guide element.

18. Apparatus as in claim 17 wherein said L-shaped element defines a slotted opening and wherein said means for enabling the adjustable positioning of said L-shaped element include:

a threaded element attached to said first guide element and passing through said slotted opening; and a third washer and a third nut positioned on said threaded element with said L-shaped element located between said first guide element and said third washer.

19. Apparatus for cutting work pieces and for use with a first support having a cutting element attached to and projecting upwardly above said support, said apparatus comprising:

first and second guide elements for attachment to said support and in substantially parallel relationship with each other;

a first slide element adapted for removable and slideable mounting on said first guide element;

a second slide element adapted for removable and slideable mounting on said second guide element;

a connecting element defining opposed ends and extending between and attached to said slide elements;

a work piece support having a work piece support surface;

means in operative relationship with said work piece support surface and said slide elements for enabling the adjustable positioning of said work piece support surface with respect to said first support and with respect to said cutting element; and means for use in operative relationship with said first guide element and with said first slide element for adjustably limiting movement of said first slide element on said first guide element.

20. Apparatus as in claim 19 wherein said first support is a router table and said cutting element is a cutting tool mounted on said router table.

* * * * *